(12) United States Patent
Seki (10) Patent No.: US 7,609,437 B2
(45) Date of Patent: Oct. 27, 2009

(54) OPTICAL AMPLIFIER APPARATUS

(75) Inventor: Atsushi Seki, Miyagi (JP)

(73) Assignee: Advantest Corporation, Tokyo (JP)

( * ) Notice: Subject to any disclaimer, the term of this patent is extended or adjusted under 35 U.S.C. 154(b) by 48 days.

(21) Appl. No.: 10/567,646

(22) PCT Filed: Aug. 11, 2004

(86) PCT No.: PCT/JP2004/011798

§ 371 (c)(1),
(2), (4) Date: Jul. 10, 2006

(87) PCT Pub. No.: WO2005/018065

PCT Pub. Date: Feb. 24, 2005

(65) Prior Publication Data

US 2007/0165298 A1    Jul. 19, 2007

(30) Foreign Application Priority Data

Aug. 13, 2003   (JP)   ............................. 2003-292765

(51) Int. Cl.
*H04B 10/17* (2006.01)
*H04B 10/12* (2006.01)
(52) U.S. Cl. .................. 359/337.1; 359/333; 359/341.3
(58) Field of Classification Search ................. 359/333, 359/337.1, 341.3
See application file for complete search history.

(56) References Cited

U.S. PATENT DOCUMENTS 5,115,338 A * 5/1992 DiGiovanni et al. ........ 359/337
6,049,416 A * 4/2000 Srivastava et al. ......... 359/337.1
6,381,063 B1 * 4/2002 Liu ............................. 359/337

(Continued)

FOREIGN PATENT DOCUMENTS

DE   101 02 176   8/2001

(Continued)

OTHER PUBLICATIONS

English Language Abstract of JP 4-150088, (May 22, 2009).

(Continued)

*Primary Examiner*—Eric Bolda
(74) *Attorney, Agent, or Firm*—Greenblum & Bernstein, P.L.C.

(57) ABSTRACT

An optical amplifier apparatus capable of dealing with different wavelength bands and capable of outputting an amplified light with reduced noise for any one of the wavelength bands. In a case of amplifying a light of C-band, terminals (51,52) of an optical switch (50) are connected to each other. An incident light is amplified by a first front-end optical fiber amplifier (12) and a first back-end optical fiber amplifier (18). The amplified light passes via the terminals (51,52) and through a back-end WDM coupler (36) and goes out of the optical amplifier apparatus (1). In a case of amplifying a light of L-band, terminals (51,54) of the optical switch (50) are connected to each other, while terminals (52,53) thereof are connected to each other. An incident light is amplified by the first front-end optical fiber amplifier (12) and first back-end optical fiber amplifier (18), passing via the terminals (51,54), thereafter being further amplified by a second front-end optical fiber amplifier (22) and a second back-end optical fiber amplifier (28). The thus amplified light then passes via the terminals (53,52) and through the back-end WDM coupler (36) and goes out of the optical amplifier apparatus (1).

18 Claims, 5 Drawing Sheets

U.S. PATENT DOCUMENTS

| | | | |
|---|---|---|---|
| 6,535,331 B2 * | 3/2003 | Shiota et al. | 359/341.32 |
| 6,583,923 B1 * | 6/2003 | Rapp | 359/337.2 |
| 6,671,085 B2 * | 12/2003 | So et al. | 359/341.42 |
| 6,891,981 B2 * | 5/2005 | Price et al. | 385/2 |
| 2001/0033411 A1 | 10/2001 | Shiota et al. | |
| 2004/0001248 A1 * | 1/2004 | Grubb et al. | 359/333 |

FOREIGN PATENT DOCUMENTS

| | | |
|---|---|---|
| DE | 698 06 785 | 2/2003 |
| EP | 0 954 071 | 6/2002 |
| JP | 4-150088 | 5/1992 |
| JP | 2001-358389 | 12/2001 |

OTHER PUBLICATIONS

Masuda et al., "High gain two-stage amplification with erbium-doped fibre amplifier," Electronics Letters, vol. 26, No. 10, pp. 661-662 (1990).

* cited by examiner

OPTICAL AMPLIFIER APPARATUS

TECHNICAL FIELD

The present invention relates to an amplification of light.

BACKGROUND ART

There has conventionally been known a wide-band optical amplifier which can amplify incident light whether the wavelength band of the incident light is the 1.55 μm band (C-band: 1.53 μm-1.56 μm) or the 1.58 μm band (L-band: 1.57 μm-1.61 μm) (refer to a patent document 1 (Japanese Laid-Open Patent Publication (Kokai) No. 2001-358389 (Abstract)), for example).

The wide-band optical amplifier of this type amplifies the incident light by passing the incident light through a first Er (Erbium)-doped optical fiber if the wavelength band of the incident light is the C-band. The wide-band optical amplifier amplifies the incident light by passing the incident light through the first Er-doped optical fiber, and then a second Er-doped optical fiber if the wavelength band of the incident light is the L-band. The light which has been amplified is output as amplified light from the wide-band optical amplifier.

On this occasion, in order to reduce a noise of the amplified light, there may be further provided an Er-doped optical fiber for low-noise amplification on a prior stage of the first Er-doped optical fiber. If the gain of the Er-doped optical fiber for low-noise amplification is increased, it is possible to reduce an influence of the noise due to the first Er-doped optical fiber.

However, if the lengths of the first Er-doped optical fiber and the Er-doped optical fiber for low-noise amplification are determined to reduce the noise of the amplified light within the C-band output by the first Er-doped optical fiber, the gain of the output of the first Er-doped optical fiber decreases. As a result, an influence of a noise due to the second Er-doped optical fiber increases, and it is thus not possible to reduce the noise of the amplified light within the L-band.

On the other hand, if the lengths of the first Er-doped optical fiber and the Er-doped optical fiber for low-noise amplification are extended to reduce the noise of the amplified light within the L-band, it is not possible to reduce the noise of the amplified light within the C-band.

In this way, it is difficult to reduce both the noises of the amplified light within the C-band and the amplified light within the L-band.

It is thus an object of the present invention to provide an optical amplifier which can be applied to different wavelength bands, and outputs amplified light with a reduced noise within either of the wavelength bands.

DISCLOSURE OF THE INVENTION

According to an aspect of the present invention, an optical amplifier apparatus includes: a first front-end optical fiber amplifier that amplifies incident light; a first front-end pumping light source that generates first pumping light supplied to the first front-end optical fiber amplifier; a first front-end pumping light introducing section that introduces the first pumping light to the first front-end optical fiber amplifier; a first back-end optical fiber amplifier that amplifies outgoing light of the first front-end optical fiber amplifier; a second front-end optical fiber amplifier; a second front-end pumping light source that generates second pumping light supplied to the second front-end optical fiber amplifier; a second front-end pumping light introducing section that introduces the second pumping light to the second front-end optical fiber amplifier from an outgoing side which is opposite to an incident side; a second back-end optical fiber amplifier that amplifies outgoing light of the second front-end optical fiber amplifier; a back-end pumping light source that generates third pumping light supplied to the first back-end optical fiber amplifier; a back-end pumping light introducing section that introduces the third pumping light to the first back-end optical fiber amplifier; and an optical connecting section that (1) connects an outgoing side of the first back-end optical fiber amplifier and the back-end pumping light introducing section to each other, or (2) connects the outgoing side of the first back-end optical fiber amplifier and the incident side of the second front-end optical fiber amplifier to each other and the outgoing side of the second back-end optical fiber amplifier and the back-end pumping light introducing section to each other, wherein the first front-end pumping light introducing section is disposed between the first front-end optical fiber amplifier and the first back-end optical fiber amplifier; and wherein the second front-end pumping light introducing section is disposed between the second front-end optical fiber amplifier and the second back-end optical fiber amplifier.

According to the thus constructed invention, a first front-end optical fiber amplifier amplifies incident light. A first front-end pumping light source generates first pumping light supplied to the first front-end optical fiber amplifier. A first front-end pumping light introducing section introduces the first pumping light to the first front-end optical fiber amplifier. A first back-end optical fiber amplifier amplifies outgoing light of the first front-end optical fiber amplifier. A second front-end pumping light source generates second pumping light supplied to the second front-end optical fiber amplifier. A second front-end pumping light introducing section introduces the second pumping light to the second front-end optical fiber amplifier from an outgoing side which is opposite to an incident side. A second back-end optical fiber amplifier amplifies outgoing light of the second front-end optical fiber amplifier. A back-end pumping light source generates third pumping light supplied to the first back-end optical fiber amplifier. A back-end pumping light introducing section introduces the third pumping light to the first back-end optical fiber amplifier. An optical connecting section (1) connects an outgoing side of the first back-end optical fiber amplifier and the back-end pumping light introducing section to each other, or (2) connects the outgoing side of the first back-end optical fiber amplifier and the incident side of the second front-end optical fiber amplifier to each other and the outgoing side of the second back-end optical fiber amplifier and the back-end pumping light introducing section to each other, wherein the first front-end pumping light introducing section is disposed between the first front-end optical fiber amplifier and the first back-end optical fiber amplifier; and wherein the second front-end pumping light introducing section is disposed between the second front-end optical fiber amplifier and the second back-end optical fiber amplifier.

According to the present invention, it is preferable that the optical amplifier apparatus include a light blocking section that blocks light from the first back-end optical fiber amplifier from being provided to the first front-end optical fiber amplifier.

According to the optical amplifier apparatus of the present invention, it is preferable that a gain of the first front-end optical fiber amplifier is set so that a noise of the first back-end optical fiber amplifier can be neglected when the optical connecting section connects the outgoing side of the first back-end optical fiber amplifier and the back-end pumping light introducing section to each other.

According to the optical amplifier apparatus of the present invention, it is preferable that a combined gain of the gain of the first front-end optical fiber amplifier, a gain of the first back-end optical fiber amplifier, and a gain of the second front-end optical fiber amplifier is set so that a noise of outgoing light of the second back-end optical fiber amplifier is approximately maintained when the optical connecting section connects the outgoing side of the first back-end optical fiber amplifier and the incident side of the second front-end optical fiber amplifier to each other.

According to the optical amplifier apparatus of the present invention, it is preferable that when the optical connecting section connects the outgoing side of the first back-end optical fiber amplifier and the back-end pumping light introducing section to each other, a wavelength band of the outgoing light of the first back-end optical fiber amplifier is C-band.

According to the optical amplifier apparatus of the present invention, it is preferable that when the optical connecting section connects the outgoing side of the first back-end optical fiber amplifier and the incident side of the second front-end optical fiber amplifier to each other, a wavelength band of the outgoing light of the second back-end optical fiber amplifier is the L-band.

According to the optical amplifier apparatus of the present invention, it is preferable that at least one of the first front-end optical fiber amplifier, the first back-end optical fiber amplifier, the second front-end optical fiber amplifier, and the second back-end optical fiber amplifier is an Erbium-doped optical fiber.

According to the optical amplifier apparatus of the present invention, it is preferable that wavelengths of the light generated by the first front-end pumping light source, the second front-end pumping light source, and the back-end pumping light source are 980 nm.

According to an aspect of the present invention, an optical amplifier apparatus includes: a first front-end optical fiber amplifier that amplifies incident light; a first front-end pumping light source that generates first pumping light supplied to the first front-end optical fiber amplifier; a first front-end pumping light coupler that introduces the first pumping light to the first front-end optical fiber amplifier; a first back-end optical fiber amplifier that amplifies outgoing light of the first front-end optical fiber amplifier; a second front-end optical fiber amplifier; a second front-end pumping light source that generates second pumping light supplied to the second front-end optical fiber amplifier; a second front-end pumping light coupler that introduces the second pumping light to the second front-end optical fiber amplifier from an outgoing side which is opposite to an incident side; a second back-end optical fiber amplifier that amplifies outgoing light of the second front-end optical fiber amplifier; a back-end pumping light source that generates third pumping light supplied to the first back-end optical fiber amplifier; a back-end pumping light coupler that introduces the third pumping light to the first back-end optical fiber amplifier; and an optical switch that (1) connects an outgoing side of the first back-end optical fiber amplifier and the back-end pumping light coupler to each other, or (2) connects the outgoing side of the first back-end optical fiber amplifier and the incident side of the second front-end optical fiber amplifier to each other and the outgoing side of the second back-end optical fiber amplifier and the back-end pumping light coupler to each other, wherein the first front-end pumping light coupler is disposed between the first front-end optical fiber amplifier and the first back-end optical fiber amplifier; and wherein the second front-end pumping light coupler is disposed between the second front-end optical fiber amplifier and the second back-end optical fiber amplifier.

According to the thus constructed invention, a first front-end optical fiber amplifier amplifies incident light. A first front-end pumping light source generates first pumping light supplied to the first front-end optical fiber amplifier. A first front-end pumping light coupler introduces the first pumping light to the first front-end optical fiber amplifier. A first back-end optical fiber amplifier amplifies outgoing light of the first front-end optical fiber amplifier. A second front-end pumping light source generates second pumping light supplied to the second front-end optical fiber amplifier. A second front-end pumping light coupler introduces the second pumping light to the second front-end optical fiber amplifier from an outgoing side which is opposite to an incident side. A second back-end optical fiber amplifier amplifies outgoing light of the second front-end optical fiber amplifier. A back-end pumping light source generates third pumping light supplied to the first back-end optical fiber amplifier. A back-end pumping light coupler introduces the third pumping light to the first back-end optical fiber amplifier. An optical switch (1) connects an outgoing side of the first back-end optical fiber amplifier and the back-end pumping light coupler to each other, or (2) connects the outgoing side of the first back-end optical fiber amplifier and the incident side of the second front-end optical fiber amplifier to each other and the outgoing side of the second back-end optical fiber amplifier and the back-end pumping light coupler to each other, wherein the first front-end pumping light coupler is disposed between the first front-end optical fiber amplifier and the first back-end optical fiber amplifier; and wherein the second front-end pumping light coupler is disposed between the second front-end optical fiber amplifier and the second back-end optical fiber amplifier.

According to the present invention, it is preferable that the optical amplifier apparatus include an optical isolator that blocks light from the first back-end optical fiber amplifier from being provided to the first front-end optical fiber amplifier.

According to the optical amplifier apparatus of the present invention, it is preferable that a gain of the first front-end optical fiber amplifier is set so that a noise of the first back-end optical fiber amplifier can be neglected when the optical switch connects the outgoing side of the first back-end optical fiber amplifier and the back-end pumping light coupler to each other.

According to the optical amplifier apparatus of the present invention, it is preferable that a combined gain of the gain of the first front-end optical fiber amplifier, a gain of the first back-end optical fiber amplifier, and a gain of the second front-end optical fiber amplifier is set so that a noise of outgoing light of the second back-end optical fiber amplifier is approximately maintained when the optical switch connects the outgoing side of the first back-end optical fiber amplifier and the incident side of the second front-end optical fiber amplifier to each other.

According to the optical amplifier apparatus of the present invention, it is preferable that a wavelength band of the outgoing light of the first back-end optical fiber amplifier is the C-band when the optical switch connects the outgoing side of the first back-end optical fiber amplifier and the back-end pumping light coupler to each other.

According to the optical amplifier apparatus of the present invention, it is preferable that a wavelength band of the outgoing light of the second back-end optical fiber amplifier is the L-band when the optical switch connects the outgoing side of the first back-end optical fiber amplifier and the incident side of the second front-end optical fiber amplifier to each other.

According to the optical amplifier apparatus of the present invention, it is preferable that at least one of the first front-end optical fiber amplifier, the first back-end optical fiber amplifier, the second front-end optical fiber amplifier, and the second back-end optical fiber amplifier is an Erbium-doped optical fiber.

According to the optical amplifier apparatus of the present invention, it is preferable that wavelengths of the light generated by the first front-end pumping light source, the second front-end pumping light source, and the back-end pumping light source are 980 nm.

According to the optical amplifier apparatus of the present invention, it is preferable that the optical amplifier apparatus include a third front-end optical fiber amplifier that amplifies the outgoing light of the second front-end optical fiber amplifier, and emits amplified light to said second back-end optical fiber amplifier; a third front-end pumping light source that generates fourth pumping light supplied to the third front-end optical fiber amplifier; and a third front-end pumping light coupler that introduces the fourth pumping light to said third front-end optical fiber amplifier from an outgoing side which is opposite to an incident side.

BEST MODE FOR CARRYING OUT THE INVENTION

A description will now be given of an embodiment of the present invention with reference to drawings.

Figure 1:
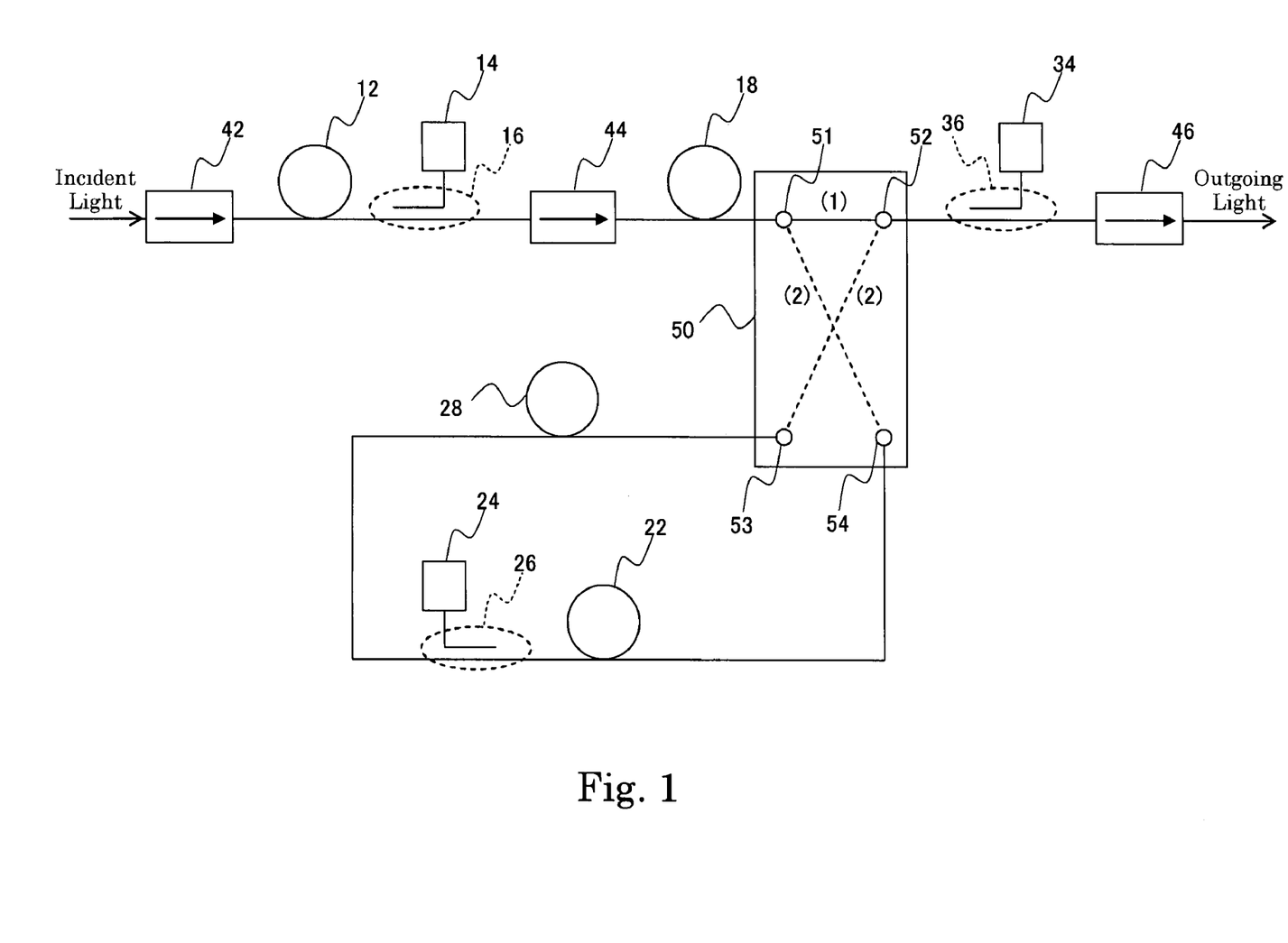
FIG. 1 is a diagram showing a configuration of an optical amplifier apparatus 1 according an embodiment of the present invention.

FIG. 1 is a diagram showing a configuration of an optical amplifier apparatus 1 according the embodiment of the present invention. The optical amplifier apparatus 1 amplifies incident light, and emits amplified light.

The optical amplifier apparatus 1 is provided with a first front-end optical fiber amplifier 12, a first front-end pumping light source 14, a first WDM coupler (first front-end pumping light introducing means) 16, a first back-end optical fiber amplifier 18, a second front-end optical fiber amplifier 22, a second front-end pumping light source 24, a second WDM coupler (second front-end pumping light introducing means) 26, a second back-end optical fiber amplifier 28, a back-end pumping light source 34, a back-end WDM coupler (back-end pumping light introducing means) 36, optical isolators 42, 44, 46, and optical switch (optical connecting means) 50.

Incident light incident on the optical amplifier apparatus 1 passes the optical isolator 42, and is made incident on the first front-end optical fiber amplifier 12. The optical isolator 42 is disposed upon a prior stage of the first front-end optical fiber amplifier 12, passes light in a direction incident on the first front-end optical fiber amplifier 12, and does not pass light in a direction outgoing from the first front-end optical fiber amplifier 12.

The first front-end optical fiber amplifier 12 amplifies the incident light which has passed the optical isolator 42, and emits the amplified light. The first front-end optical fiber amplifier 12 is an Er (Erbium)-doped optical fiber, for example.

The first front-end pumping light source 14 generates first pumping light which is supplied to the first front-end optical fiber amplifier 12.

The first WDM coupler (first front-end pumping light introducing means) 16 receives the first pumping light from the first front-end pumping light source 14, and supplies the first front-end optical fiber amplifier 12 with the first pumping light. The first WDM coupler 16 is connected to an outgoing side (side opposite to a side to receive the incident light) of the first front-end optical fiber amplifier 12. It should be noted that the outgoing light of the first front-end optical fiber amplifier 12 passes the first WDM coupler 16.

The outgoing light of the first front-end optical fiber amplifier 12 passes the optical isolator (light blocking means) 44, and is made incident on the first back-end optical fiber amplifier 18. The optical isolator (light blocking means) 44 is disposed upon a prior stage of the first back-end optical fiber amplifier 18, passes light directed from the first front-end optical fiber amplifier 12 to the first back-end optical fiber amplifier 18, and does not pass light directed from the first back-end optical fiber amplifier 18 to the first front-end optical fiber amplifier 12. The optical isolator (light blocking means) 44 blocks a spontaneous emission incident from the first back-end optical fiber amplifier 18 to the first front-end optical fiber amplifier 12, thereby reducing unnecessary signal-ASE beat noise and ASE-ASE beat noise in the first front-end optical fiber amplifier 12, resulting in an efficient and low noise signal amplification. It should be noted that the signal implies the incident light incident on the optical amplifier apparatus 1.

The first back-end optical fiber amplifier 18 amplifies the light which has passed the optical isolator 44, and emits amplified light. The first back-end optical fiber amplifier 18 is an Er (Erbium)-doped optical fiber, for example. It should be noted that the pumping light for the first back-end optical fiber amplifier 18 originates from the back-end pumping light source 34 (upon a terminal 51 and a terminal 52 being connected to each other) or the second front-end pumping light source 24 (upon the terminal 51 and a terminal 54 being connected to each other).

The second front-end optical fiber amplifier 22 amplifies outgoing light of the first back-end optical fiber amplifier 18 upon the terminal 51 and the terminal 54 being connected to each other. The second front-end optical fiber amplifier 22 is an Er (Erbium)-doped optical fiber, for example.

The second front-end pumping light source 24 generates second pumping light which is supplied to the second front-end optical fiber amplifier 22.

The second WDM coupler (second front-end pumping light introducing means) 26 receives the second pumping light from the second front-end pumping light source 24, and supplies the second front-end optical fiber amplifier 22 with the second pumping light. The second WDM coupler 26 is connected to an outgoing side (side opposite to an incident side connected to the terminal 54) of the second front-end optical fiber amplifier 22. It should be noted that the outgoing light of the second front-end optical fiber amplifier 22 passes the second WDM coupler 26.

The second back-end optical fiber amplifier 28 amplifies the outgoing light of the second front-end optical fiber amplifier 22, and emits amplified light. The second back-end optical fiber amplifier 28 is an Er (Erbium)-doped optical fiber, for example. It should be noted that the pumping light for the second back-end optical fiber amplifier 28 originates from the back-end pumping light source 34 (upon the terminal 52 and a terminal 53 being connected to each other).

The back-end pumping light source 34 generates third pumping light supplied to the first back-end optical fiber amplifier 18 (upon the terminal 51 and the terminal 52 being connected to each other), or pumping light supplied to the second back-end optical fiber amplifier 28 (upon the terminal 52 and the terminal 53 being connected to each other).

The back-end WDM coupler (back-end pumping light introducing means) 36 receives the third pumping light from the back-end pumping light source 34, and supplies the first back-end optical fiber amplifier 18 with the third pumping light (upon the terminal 51 and the terminal 52 being connected to each other). Alternatively, the back-end WDM coupler 36 receives the pumping light from the back-end pumping light source 34, and supplies the second back-end optical fiber amplifier 28 with the pumping light (upon the terminal 52 and the terminal 53 being connected to each other). It should be noted that the outgoing light of the first back-end optical fiber amplifier 18 and outgoing light of the second back-end optical fiber amplifier 28 pass the back-end WDM coupler 36.

The light which has passed the back-end WDM coupler 36 passes the optical isolator 46. This light is outgoing light of the optical amplifier apparatus 1. The optical isolator 46 is disposed on a posterior stage of the back-end WDM coupler 36, passes light in a direction outgoing from the back-end WDM coupler 36, and does not pass light in a direction incident on the back-end WDM coupler 36.

The optical switch (optical connecting means) 50 includes the terminals 51, 52, 53, and 54. The terminal 51 is connected to the outgoing side of the first back-end optical fiber amplifier 18. The terminal 52 is connected to the back-end WDM coupler 36. The terminal 53 is connected to the outgoing side of the second back-end optical fiber amplifier 28. The terminal 54 is connected to the incident side of the second front-end optical fiber amplifier 22.

The optical switch 50 (1) connects the terminal 51 and the terminal 52 to each other, or (2) connects the terminal 51 and the terminal 54 to each other, and simultaneously connects the terminal 52 and the terminal 53 to each other.

(1) Upon the terminal 51 and the terminal 52 being connected to each other, the outgoing side of the first back-end optical fiber amplifier 18 and the back-end WDM coupler 36 are connected to each other.

(2) Upon the terminal 51 and the terminal 54 being connected to each other, and, simultaneously, the terminal 52 and the terminal 53 being connected to each other, the outgoing side of the first back-end optical fiber amplifier 18 and the incident side of the second front-end optical fiber amplifier 22 are connected to each other, and, simultaneously, the back-end WDM coupler 36 and the outgoing side of the second back-end optical fiber amplifier 28 are connected to each other.

A description will now be given of an operation of the present invention.

If the optical amplifier apparatus 1 receives incident light within the 1.55 µm band (C-band: 1.53 µm-1.56 µm), the optical amplifier apparatus 1 connects the terminal 51 and the terminal 52 to each other to emit the light within the C-band. If the optical amplifier apparatus 1 receives incident light within the 1.58 µm band (L-band: 1.57 µm-1.61 µm), the optical amplifier apparatus 1 connects the terminal 51 and the terminal 54 to each other, and simultaneously connects the terminal 52 and the terminal 53 to each other to emit the light within the L-band.

(1) Upon the terminal 51 and the terminal 52 being connected to each other (to amplify incident light within the C-band)

Incident light within the C-band is made incident on the optical amplifier apparatus 1. The incident light passes the optical isolator 42, and is made incident on the first front-end optical fiber amplifier 12.

The first front-end pumping light source 14 generates the first pumping light, and the first pumping light is introduced into the first front-end optical fiber amplifier 12 by the first WDM coupler 16. As a result, the first front-end optical fiber amplifier 12 is pumped and comes to amplify the incident light.

The first front-end optical fiber amplifier 12 amplifies the incident light, and emits the amplified incident light. The outgoing light passes the first WDM coupler 16, and then passes the optical isolator (light blocking means) 44. This light is made incident on the first back-end optical fiber amplifier 18.

The back-end pumping light source 34 generates the third pumping light, and the third pumping light is introduced into the first back-end optical fiber amplifier 18 by the back-end WDM coupler 36 via the terminal 52 and the terminal 51. As a result, the first back-end optical fiber amplifier 18 is pumped, and comes to amplify the outgoing light of the first front-end optical fiber amplifier 12.

It should be noted that the first front-end optical fiber amplifier 12 and the first back-end optical fiber amplifier 18 have fiber lengths optimized to amplify the incident light within the C-band with a low noise. Further, the gain of the first front-end optical fiber amplifier 12 (upon amplifying the incident light within the C-band) is as large as a noise caused by the first back-end optical fiber amplifier 18 can be neglected.

The outgoing light of the first back-end optical fiber amplifier 18 routes through the terminal 51 and the terminal 52, passes the back-end WDM coupler 36, and then passes the optical isolator 46. This light is outgoing light of the optical amplifier apparatus 1.

If the incident light within the C-band is amplified, the noise can be reduced by properly determining the fiber lengths of the first front-end optical fiber amplifier 12 and the first back-end optical fiber amplifier 18 and the like.

(2) Upon the terminal 51 and the terminal 54 being connected to each other and, simultaneously, the terminal 52 and the terminal 53 being connected to each other (to amplify incident light within the L-band)

Incident light within the L-band is made incident on the optical amplifier apparatus 1. The incident light passes the optical isolator 42, and is made incident on the first front-end optical fiber amplifier 12.

The first front-end pumping light source 14 generates the first pumping light, and the first pumping light is introduced into the first front-end optical fiber amplifier 12 by the first WDM coupler 16. As a result, the first front-end optical fiber amplifier 12 is pumped and comes to amplify the incident light.

The first front-end optical fiber amplifier 12 amplifies the incident light, and emits the amplified incident light. The outgoing light passes the first WDM coupler 16, and then passes the optical isolator (light blocking means) 44. This light is made incident on the first back-end optical fiber amplifier 18.

The second front-end pumping light source 24 generates second pumping light which is supplied to the second front-end optical fiber amplifier 22. The second pumping light is introduced into the second front-end optical fiber amplifier 22 by the second WDM coupler 26. The second pumping light transmits from the outgoing side to the incident side of the second front-end optical fiber amplifier 22, and then is introduced into the first back-end optical fiber amplifier 18 via the terminal 54 and the terminal 51 (undergoes an insertion loss of the optical switch 50 on this occasion). As a result, the first back-end optical fiber amplifier 18 is pumped, and comes to amplify the outgoing light of the first front-end optical fiber amplifier 12. Further, the second front-end optical fiber amplifier 22 is pumped, and comes to amplify the outgoing light of the first back-end optical fiber amplifier 18. The first back-end optical fiber amplifier 18 and the second front-end optical fiber amplifier 22 can be controlled by the single light source (second front-end pumping light source 24). It should be noted that since the first front-end optical fiber amplifier 12 is disposed prior to the optical isolator 44, the first front-end optical fiber amplifier 12 is not influenced by the second front-end pumping light source 24.

The outgoing light of the first back-end optical fiber amplifier 18 routes through the terminals 51 and 54, and is made incident on the second front-end optical fiber amplifier 22. The second front-end optical fiber amplifier 22 amplifies the outgoing light of the first back-end optical fiber amplifier 18. The outgoing light of the second front-end optical fiber amplifier 22 passes the second WDM coupler 26, and is made incident on the second back-end optical fiber amplifier 28.

The back-end pumping light source 34 generates the pumping light which is supplied to the second back-end optical fiber amplifier 28. The pumping light is introduced into the second back-end optical fiber amplifier 28 by the back-end WDM coupler 36. As a result, the second back-end optical fiber amplifier 28 is pumped, and comes to amplify the outgoing light of the second front-end optical fiber amplifier 22.

The second back-end optical fiber amplifier 28 amplifies the outgoing light of the second front-end optical fiber amplifier 22. The outgoing light of the second back-end optical fiber amplifier 28 routes through the terminal 53 and the terminal 52, passes the back-end WDM coupler 36, and then passes the optical isolator 46. This light is outgoing light of the optical amplifier apparatus 1.

It should be noted that the sum of the fiber lengths of the first front-end optical fiber amplifier 12, the first back-end optical fiber amplifier 18, the second front-end optical fiber amplifier 22, and the second back-end optical fiber amplifier 28 is an optimal length to amplify the light within the L-band. Moreover, the sum of the fiber lengths of the first front-end optical fiber amplifier 12, the first back-end optical fiber amplifier 18, and the second front-end optical fiber amplifier 22 is set such that a combined gain obtained by combining the gain of the first front-end optical fiber amplifier 12, the gain of the first back-end optical fiber amplifier 18, and the gain of the second front-end optical fiber amplifier 22 does not largely increase a noise of the outgoing light of the second back-end optical fiber amplifier 28, and keeps it approximately constant.

If the incident light within the C-band is amplified, the noise of the light within the C-band can be reduced by properly determining fiber lengths of the first front-end optical fiber amplifier 12 and the first back-end optical fiber amplifier 18 and the like. However, in this case, a gain caused by the first front-end optical fiber amplifier 12 and the first back-end optical fiber amplifier 18 is as small as a few dB. Thus, if the outgoing light of the first back-end optical fiber amplifier 18 is directly supplied to the second back-end optical fiber amplifier 28, a noise due to the second back-end optical fiber amplifier 28 largely influences, and a noise of the amplified light within the L-band increases. To address this problem, a gain on a prior stage of the second back-end optical fiber amplifier 28 is increased by providing the second front-end optical fiber amplifier 22. As a result, the influence of the noise caused by the second back-end optical fiber amplifier 28 can be reduced, thereby reducing the noise of the amplified light within the L-band.

According to the embodiment of the present invention, the noise of light obtained by amplifying incident light within the C-band can be reduced by properly determining the fiber lengths of the first front-end optical fiber amplifier 12 and the first back-end optical fiber amplifier 18 and the like. Moreover, since the gain on the prior stage of the second back-end optical fiber amplifier 28 is increased by providing the second front-end optical fiber amplifier 22, it is also possible to reduce the noise of light obtained by amplifying incident light within the L-band.

Figure 5:
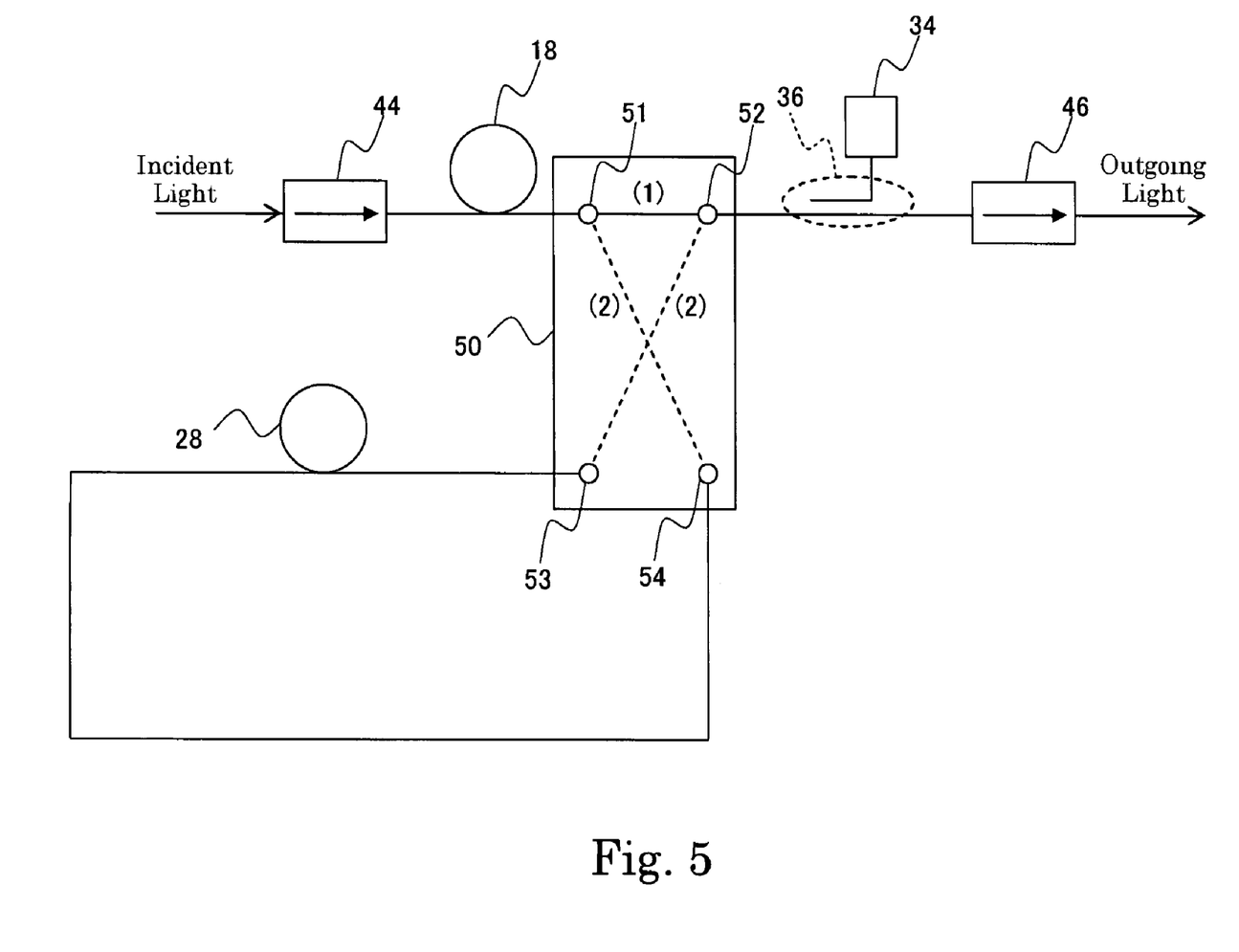
FIG. 5 shows an example where there are omitted a part of the components of the optical amplifier apparatus 1 shown in FIG. 1.

Moreover, FIG. 5 shows an example where there are omitted a part of the components of the optical amplifier apparatus 1 shown in FIG. 1. As shown in FIG. 5, it is possible to omit the first front-end optical fiber amplifier 12, the first front-end pumping light source 14, the first WDM coupler (first front-end pumping light introducing means) 16, the second front-end optical fiber amplifier 22, the second front-end pumping light source 24, the second WDM coupler (second front-end pumping light introducing means) 26, and the optical isolator 42. The first back-end optical fiber amplifier 18 corresponds to a first optical fiber amplifier, and the second back-end optical fiber amplifier 28 corresponds to a second optical fiber amplifier. According to the configuration shown in FIG. 5, the first back-end optical fiber amplifier 18 and the second back-end optical fiber amplifier 28 are pumped backward (receive pumping light on the outgoing side) by the back-end pumping light source 34, and the noise thus can be reduced by an amount of the eliminated first WDM coupler 16.

Figure 2:
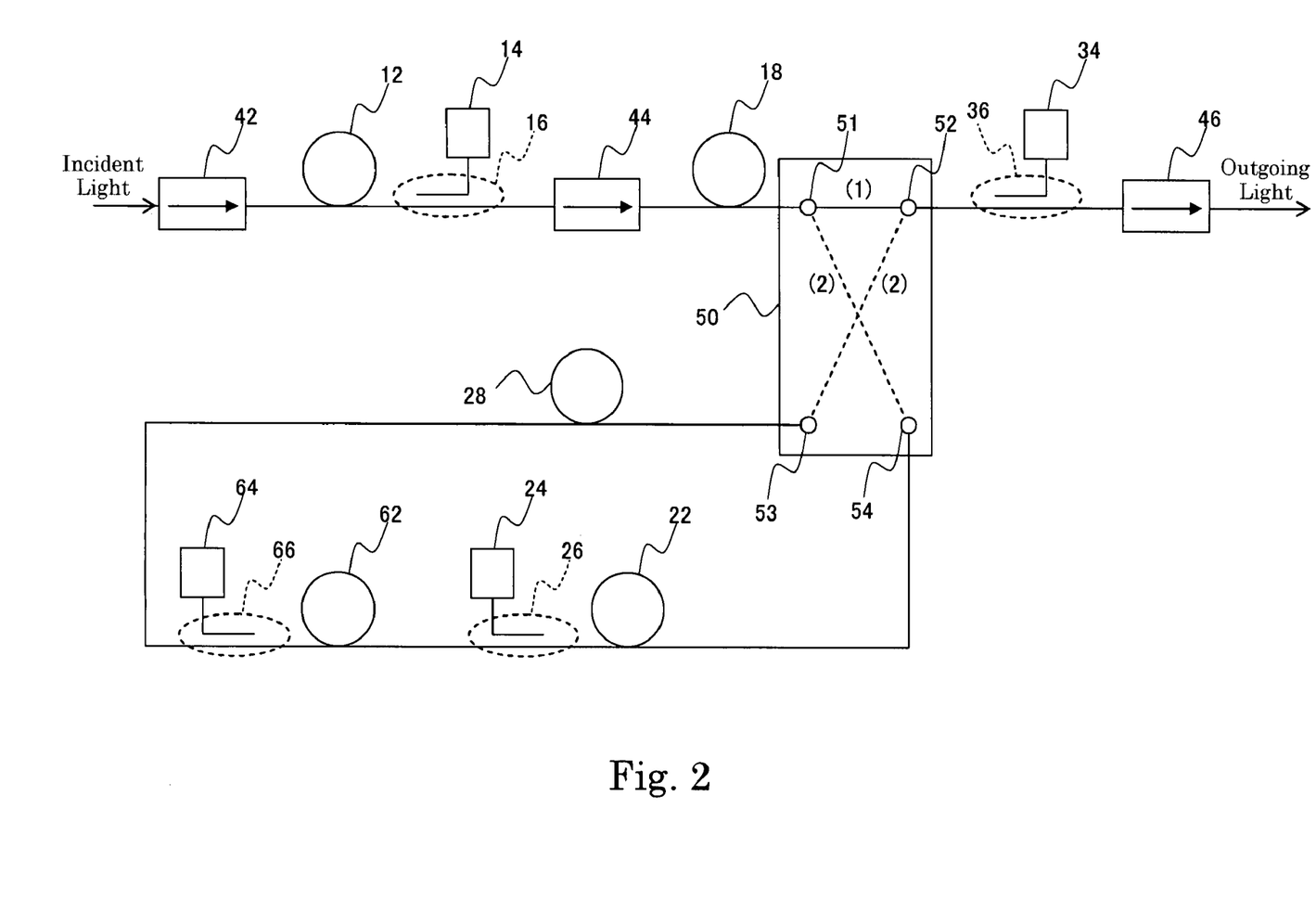
FIG. 2 is a diagram showing a configuration of the variation of the optical amplifier apparatus 1 according the embodiment of the present invention.

As a variation, between the second back-end optical fiber amplifier 28 and the second front-end optical fiber amplifier 22 may be provided a third front-end optical fiber amplifier 62, a third front-end pumping light source 64, and a third WDM coupler (third front-end pumping light introducing means) 66.

FIG. 2 is a diagram showing a configuration of the variation of the optical amplifier apparatus 1 according the embodiment of the present invention. Parts and elements other than the third front-end optical fiber amplifier 62, the third front-end pumping light source 64, and the third WDM coupler (third front-end pumping light introducing means) 66 are as described with reference to FIG. 1, and a description thereof, therefore, is omitted.

The third front-end optical fiber amplifier 62 amplifies the outgoing light of the second front-end optical fiber amplifier 22, and emits amplified light to the second back-end optical fiber amplifier 28.

The third front-end pumping light source 64 generates fourth pumping light which is supplied to the third front-end optical fiber amplifier 62.

The third WDM coupler (third front-end pumping light introducing means) 66 receives the fourth pumping light from the third front-end pumping light source 64, and supplies the third front-end optical fiber amplifier 62 with the fourth pumping light. The third WDM coupler 66 is connected to an outgoing side (side opposite to a side to receive incident light) of the third front-end optical fiber amplifier 62. It should be noted that the outgoing light of the third front-end optical fiber amplifier 62 passes the third WDM coupler 66.

EXAMPLE 1

Figure 3:
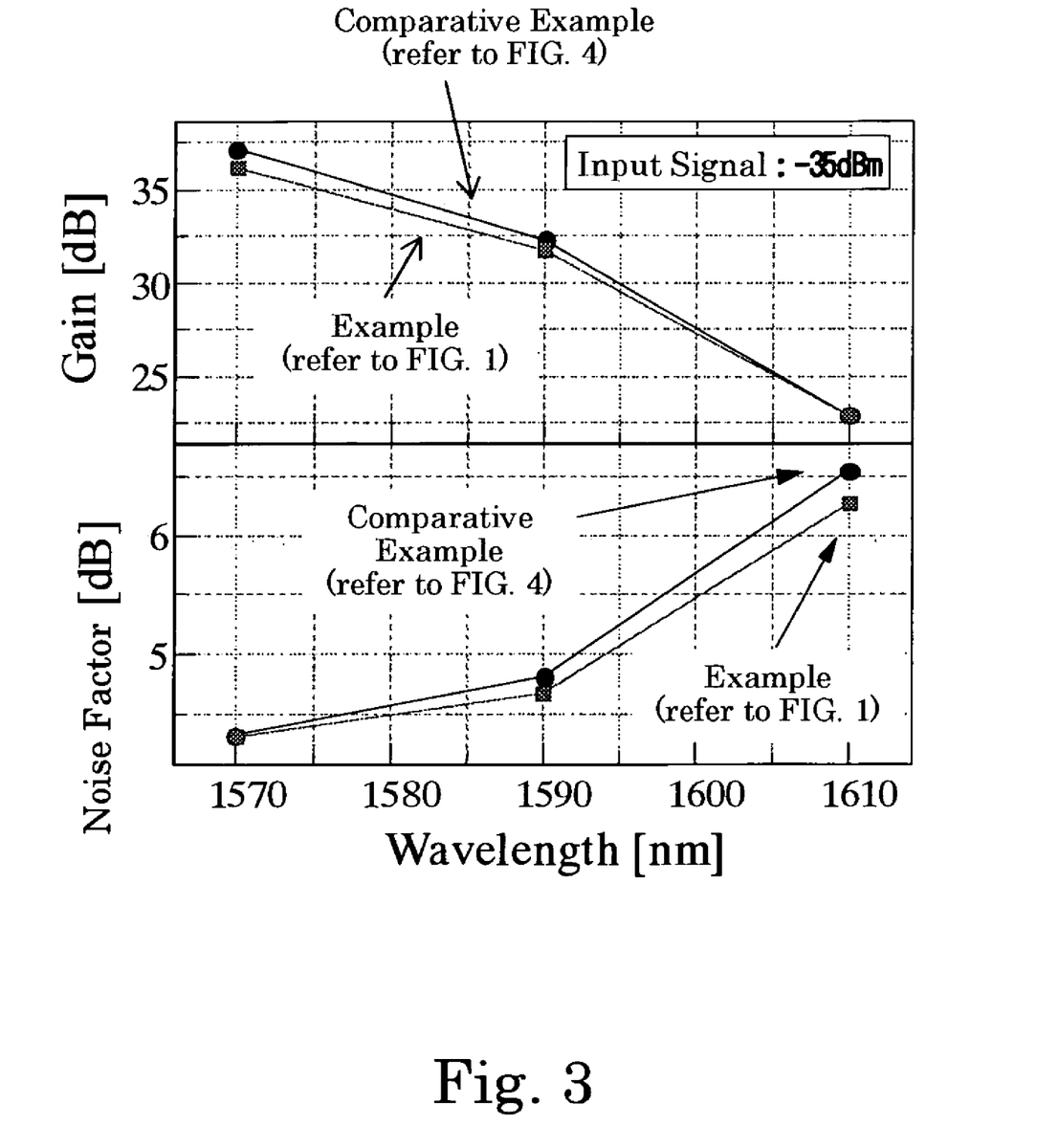
FIG. 3 is a diagram showing a relationship between the wavelength and the gain, and a relationship between the wavelength and the noise factor of an example and a comparable example.

In the optical amplifier apparatus 1 described with reference to FIG. 1, it is assumed that the wavelength of the light generated by the first front-end pumping light source 14, the second front-end pumping light source 24, and the back-end pumping light source 34 is 980 nm, the pumping intensity of the first front-end pumping light source 14 is 70 mW, the pumping intensity of the second front-end pumping light source 24 is 100 mW, the pumping intensity of the back-end pumping light source 34 is 100 mW, the wavelength of the incident light (signal light) made incident on the optical amplifier apparatus 1 is 1610 nm, and the intensity of the incident light (signal light) is −35 dBm. FIG. 3 shows a relationship between the wavelength and the gain, and a relationship between the wavelength and the noise factor on this occasion (denoted by Example).

Figure 4:
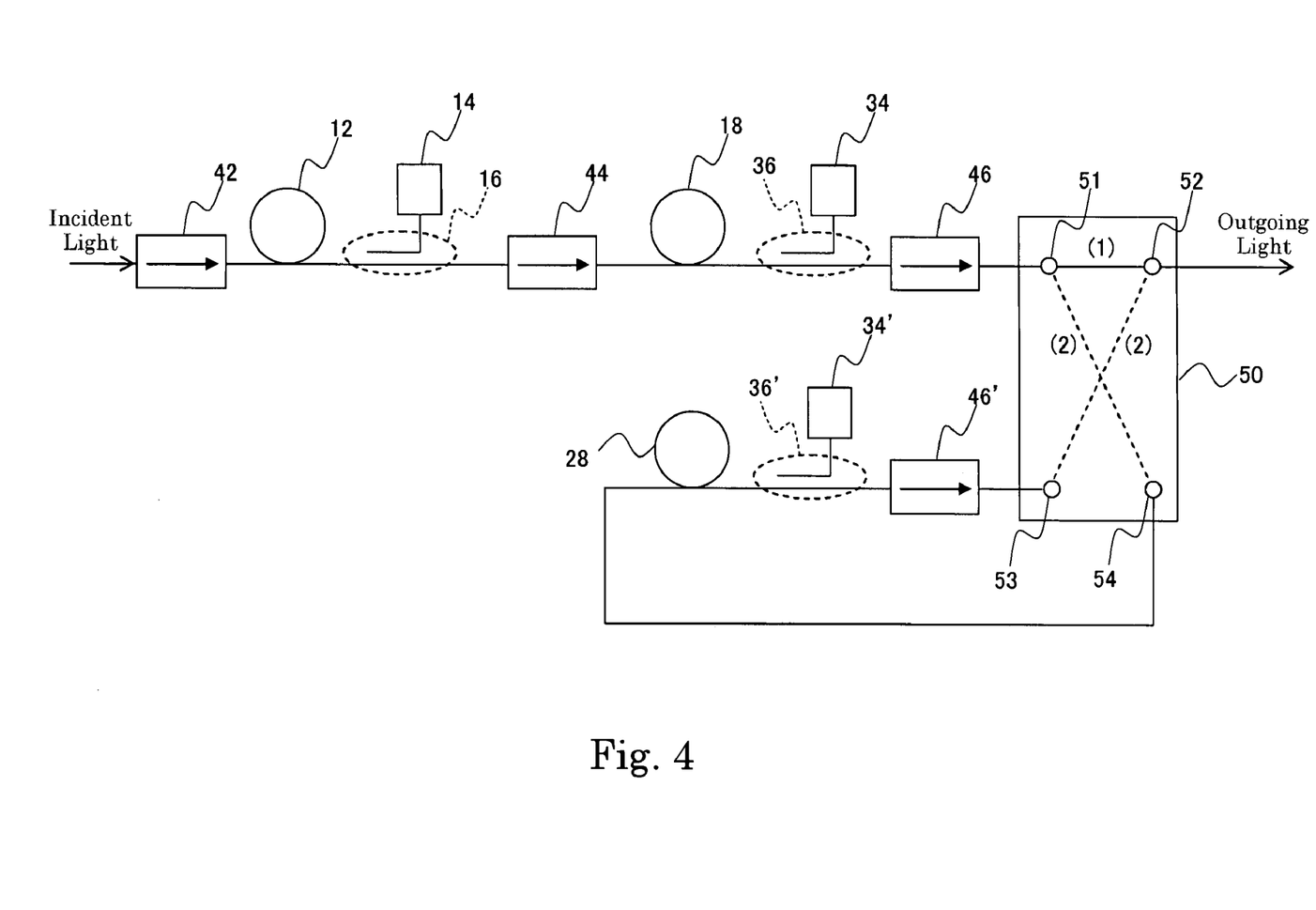
FIG. 4 is a diagram showing a configuration of a comparative example (obtained by removing the second front-end optical fiber amplifier 22)

It should be noted that FIG. 4 shows an example without the second front-end optical fiber amplifier 22 as a comparative example. The comparative example shown in FIG. 4 has a configuration obtained by removing the second front-end optical fiber amplifier 22, the second front-end pumping light source 24, and the second WDM coupler 26 from the optical amplifier apparatus 1 described with reference to FIG. 1. It should be noted that the back-end pumping light source 34, the back-end WDM coupler 36, and the optical isolator 46 are moved between the first back-end optical fiber amplifier 18 and the terminal 51. Moreover, between the second back-end optical fiber amplifier 28 and the terminal 53 are provided a back-end pumping light source 34', a back-end WDM coupler 36', and an optical isolator 46', which are identical to the back-end pumping light source 34, the back-end WDM coupler 36, and the optical isolator 46. The wavelength and the pumping intensity of the light generated by the first front-end pumping light source 14, the second front-end pumping light source 24, and the back-end pumping light source 34, and the wavelength and intensity of the incident light (signal light) incident on the optical amplifier apparatus 1 are the same as those of the above example. FIG. 3 also shows a relationship between the wavelength and the gain, and a relationship between the wavelength and the noise factor of the comparable example (denoted by Comparative Example).

It is appreciated from FIG. 3 that the gain and the noise factor of the Example are smaller than those of the Comparable Example. It is thus apparent that the Example provides better characteristics than the Comparable Example.

The invention claimed is:

1. An optical amplifier apparatus comprising:
    a first front-end optical fiber amplifier that amplifies incident light;
    a first front-end pumping light source that generates first pumping light supplied to said first front-end optical fiber amplifier;
    a first front-end pumping light introducing section that introduces the first pumping light to said first front-end optical fiber amplifier;
    a first back-end optical fiber amplifier that amplifies outgoing light of said first front-end optical fiber amplifier;
    a second front-end optical fiber amplifier;
    a second front-end pumping light source that generates second pumping light supplied to said second front-end optical fiber amplifier;
    a second front-end pumping light introducing section that introduces the second pumping light to said second front-end optical fiber amplifier from an outgoing side which is opposite to an incident side;
    a second back-end optical fiber amplifier that amplifies outgoing light of said second front-end optical fiber amplifier;
    a back-end pumping light source that generates third pumping light supplied to said first back-end optical fiber amplifier;
    a back-end pumping light introducing section that introduces the third pumping light to said first back-end optical fiber amplifier; and
    an optical connecting section that (1) connects an outgoing side of said first back-end optical fiber amplifier and said back-end pumping light introducing section to each other, or (2) connects the outgoing side of said first back-end optical fiber amplifier and the incident side of said second front-end optical fiber amplifier to each other and the outgoing side of said second back-end optical fiber amplifier and said back-end pumping light introducing section to each other,
    wherein said first front-end pumping light introducing section is disposed between said first front-end optical fiber amplifier and said first back-end optical fiber amplifier; and
    wherein said second front-end pumping light introducing section is disposed between said second front-end optical fiber amplifier and said second back-end optical fiber amplifier.

2. The optical amplifier apparatus according to claim 1, further comprising:
    a light blocking section that blocks light from said first back-end optical fiber amplifier from being provided to said first front-end optical fiber amplifier.

3. The optical amplifier apparatus according to claim 1, wherein a gain of said first front-end optical fiber amplifier is set so that a noise of said first back-end optical fiber amplifier can be neglected when said optical connecting section connects the outgoing side of said first back-end optical fiber amplifier and said back-end pumping light introducing section to each other.

4. The optical amplifier apparatus according to claim 3, wherein a combined gain of the gain of said first front-end optical fiber amplifier, a gain of said first back-end optical fiber amplifier, and a gain of said second front-end optical fiber amplifier is set so that a noise of outgoing light of said second back-end optical fiber amplifier is approximately maintained when said optical connecting section connects the outgoing side of said first back-end optical fiber amplifier and the incident side of said second front-end optical fiber amplifier to each other.

5. The optical amplifier apparatus according to claim 1, wherein when said optical connecting section connects the outgoing side of said first back-end optical fiber amplifier and said back-end pumping light introducing section to each, other, a wavelength band of the outgoing light of said first back-end optical fiber amplifier is the C-band.

6. The optical amplifier apparatus according to claim 1, wherein when said optical connecting section connects the outgoing side of said first back-end optical fiber amplifier and the incident side of said second front-end optical fiber amplifier to each other, a wavelength band of the outgoing light of said second back-end optical fiber amplifier is the L-band.

7. The optical amplifier apparatus according to claim 1, wherein at least one of said first front-end optical fiber amplifier, said first back-end optical fiber amplifier, said second front-end optical fiber amplifier, and said second back-end optical fiber amplifier is an Erbium-doped optical fiber.

8. The optical amplifier apparatus according to claim 1, wherein wavelengths of the light generated by said first front-end pumping light source, said second front-end pumping light source, and said back-end pumping light source are 980 nm.

9. The optical amplifier apparatus according to claim 1, comprising:
  a third front-end optical fiber amplifier that amplifies the outgoing light of said second front-end optical fiber amplifier, and emits amplified light to said second back-end optical fiber amplifier;
  a third front-end pumping light source that generates fourth pumping light supplied to said third front-end optical fiber amplifier; and
  a third front-end pumping light introducing means that introduces the fourth pumping light to said third front-end optical fiber amplifier from an outgoing side which is opposite to an incident side.

10. An optical amplifier apparatus comprising:
  a first front-end optical fiber amplifier that amplifies incident light;
  a first front-end pumping light source that generates first pumping light supplied to said first front-end optical fiber amplifier;
  a first front-end pumping light coupler that introduces the first pumping light to said first front-end optical fiber amplifier;
  a first back-end optical fiber amplifier that amplifies outgoing light of said first front-end optical fiber amplifier;
  a second front-end optical fiber amplifier;
  a second front-end pumping light source that generates second pumping light supplied to said second front-end optical fiber amplifier;
  a second front-end pumping light coupler that introduces the second pumping light to said second front-end optical fiber amplifier from an outgoing side which is opposite to an incident side;
  a second back-end optical fiber amplifier that amplifies outgoing light of said second front-end optical fiber amplifier;
  a back-end pumping light source that generates third pumping light supplied to said first back-end optical fiber amplifier;
  a back-end pumping light coupler that introduces the third pumping light to said first back-end optical fiber amplifier; and
  an optical switch that (1) connects an outgoing side of said first back-end optical fiber amplifier and said back-end pumping light coupler to each other, or (2) connects the outgoing side of said first back-end optical fiber amplifier and the incident side of said second front-end optical fiber amplifier to each other and the outgoing side of said second back-end optical fiber amplifier and said back-end pumping light coupler to each other,
  wherein said first front-end pumping light coupler is disposed between said first front-end optical fiber amplifier and said first back-end optical fiber amplifier; and
  wherein said second front-end pumping light coupler is disposed between said second front-end optical fiber amplifier and said second back-end optical fiber amplifier.

11. The optical amplifier apparatus according to claim 10, comprising an optical isolator that blocks light from said first back-end optical fiber amplifier from being provided to said first front-end optical fiber amplifier.

12. The optical amplifier apparatus according to claim 10, wherein a gain of said first front-end optical fiber amplifier is set so that a noise of said first back-end optical fiber amplifier can be neglected when said optical switch connects the outgoing side of said first back-end optical fiber amplifier and said back-end pumping light coupler to each other.

13. The optical amplifier apparatus according to claim 12, wherein a combined gain of the gain of said first front-end optical fiber amplifier, a gain of said first back-end optical fiber amplifier, and a gain of said second front-end optical fiber amplifier is set so that a noise of outgoing light of said second back-end optical fiber amplifier is approximately maintained when said optical switch connects the outgoing side of said first back-end optical fiber amplifier and the incident side of said second front-end optical fiber amplifier to each other.

14. The optical amplifier apparatus according to claim 10, wherein a wavelength band of the outgoing light of said first back-end optical fiber amplifier is the C-band when said optical switch connects the outgoing side of said first back-end optical fiber amplifier and said back-end pumping light coupler to each other.

15. The optical amplifier apparatus according to claim 10, wherein a wavelength band of the outgoing light of said second back-end optical fiber amplifier is the L-band when said optical switch connects the outgoing side of said first back-end optical fiber amplifier and the incident side of said second front-end optical fiber amplifier to each other.

16. The optical amplifier apparatus according to claim 10, wherein at least one of said first front-end optical fiber amplifier, said first back-end optical fiber amplifier, said second front-end optical fiber amplifier, and said second back-end optical fiber amplifier is an Erbium-doped optical fiber.

17. The optical amplifier apparatus according to claim 10, wherein wavelengths of the light generated by said first front-end pumping light source, said second front-end pumping light source, and said back-end pumping light source are 980 nm.

18. The optical amplifier apparatus according to claim 10, further comprising:
  a third front-end optical fiber amplifier that amplifies the outgoing light of said second front-end optical fiber amplifier, and emits amplified light to said second back-end optical fiber amplifier;
  a third front-end pumping light source that generates fourth pumping light supplied to said third front-end optical fiber amplifier; and
  a third front-end pumping light coupler that introduces the fourth pumping light to said third front-end optical fiber amplifier from an outgoing side which is opposite to an incident side.

* * * * *